United States Patent [19]

Gopal et al.

[11] Patent Number: 5,491,817

[45] Date of Patent: Feb. 13, 1996

[54] LINKING SYSTEM AND METHOD FOR ACCESSING DIRECTORY INFORMATION ABOUT AN OBJECT IN ONE CONTEXT WHEN INFORMATION IN ANOTHER CONTEXT IS KNOWN

[75] Inventors: Gita Gopal, Wayne; Sze-Ying Wuu, Branchburg, both of N.J.

[73] Assignee: Bell Communications Research Inc., Livingston, N.J.

[21] Appl. No.: 68,822

[22] Filed: May 25, 1993

[51] Int. Cl.$^6$ .................................................. G06F 17/30
[52] U.S. Cl. ................... 395/600; 364/DIG. 1; 364/282.3; 364/282.4
[58] Field of Search ...................... 395/200, 600, 395/650

[56] References Cited

U.S. PATENT DOCUMENTS

| | | | |
|---|---|---|---|
| 4,313,035 | 1/1982 | Jordan et al. | 379/211 |
| 4,878,239 | 10/1989 | Solomon et al. | 379/196 |
| 4,954,958 | 9/1990 | Savage et al. | 379/97 |
| 5,058,152 | 10/1991 | Solomon et al. | 379/196 |
| 5,303,235 | 4/1994 | Chan et al. | 370/60.1 |
| 5,345,586 | 9/1994 | Hamala et al. | 395/650 |

OTHER PUBLICATIONS

CCITT, The Directory—*Overview of Concepts, Models, and Services*, X.500 Series Recommendation, Document AP IX–47–E, 1988.
"The Clearinghouse: A Decentralized Agent for Locating Named Objects in a Distributed Environment," D. Oppen and Y Dalal, ACM Transactions on Office Information Systems, vol. 1, No. 3, Jul. 1983.
"Designing a Global Name Service," B. Lampson, Proceedings of Fifth Symposium on the Principles of Distributed Computing, Aug. 1986.
"The Profile Naming Service," L. L. Peterson, ACM Transactions on Computer Systems, vol. 6, No. 4, Nov. 1988.
"Mapping the North American DIT onto Directory Management Domains, Name and Knowledge Sharing," North American Directory Forum, Version 8.0, Jan. 1993.
"InterNIC Directory and Database Services Directory of Directories," AT&T Business Communications Services, 1991.

Primary Examiner—Thomas G. Black
Assistant Examiner—John C. Loomis
Attorney, Agent, or Firm—Leonard Charles Suchyta; Loria B. Yeadon

[57] ABSTRACT

Our linking method is implemented in our linking system which includes an interconnection network, which employs a standard directory protocol, such as X.500, and linking components. The interconnection network includes interfaces for interconnection users and local directories. The linking components include linking directories and linking applications which are connected to the interconnection network via interfaces. Linking directories contain entries, and each entry comprises linking references pointing to entities, which include local directories and linking applications and have access to information about the object in different contexts. In the linking directory, there is an entry for each object, and this entry is accessible using a linking identifier unique the object. The linking application coordinates a response to the user's request and sends queries to the linking directory, local directories, and other linking application to fulfill user's requests. A user can access requested information by inputting known information about an object in one context along with a request for information about the object in another context. The known information is used by the linking application to query a local directory in the network for the linking identifier corresponding to the object. The linking application then uses the linking identifier to query the linking directory for linking references pointing entities having further access to information about the object in the specified context. The linking application uses the linking reference to locate the entities pointed to and the linking identifier as a key to retrieve the requested information. This retrieved information is formatted by the linking application and forwarded to the user in response to the request.

21 Claims, 17 Drawing Sheets

Fig. 1

| Credit Entities for John Doe | | |
|---|---|---|
| Entity | Directory | Information Context |
| BOC Telephone Company | White Page | Residential |
| Division of Motor Vehicles (DMV) | Licensed Driver | Residential |
| ABC Bank | Automobile | Loan |
| | Mortgage | Loan |
| | Personal | Loan |
| Credit Card (CC) Company | Visa | Credit Card |
| | Mastercard | Credit Card |
| DOM Corporation | Personnel | Business |
| | Pension | Loan |

Fig. 6

| Name = John Doe | Local Identifier = 2015552121 |
|---|---|
| Residential Phone = (201) 555-2121<br><br>Residential Address = 21 Elm Street<br>          Elmville, NJ 07001 ||

Fig. 7

| Name = John Doe | Linking Identifier = AW33C |
|---|---|
| Driver's License # | = NJB074647851626 |
| Residential Address | = 21 Elm Street<br>= Elmville, NJ 07001 |
| Residential Phone | = (201) 555-2121 |
| Date of Birth | = 12/12/50 |
| Male/Female | = Male |

Fig. 8A

| Name = John Doe | Linking Identifier = AW33C |
|---|---|
| Account # | = NY6643 |
| Account Balance | = $10,500 |
| Monthly Payment | = $310 |

Fig. 8B

| Name = John Doe | Linking Identifier = AW33C |
|---|---|
| Account # | = NJ5532 |
| Account Balance | = $87,543 |
| Monthly Payment | = $675 |

Fig. 8C

| Name = John Doe | Linking Identifier = AW33C |
|---|---|
| Account # | = NY7749 |
| Account Balance | = $2,540 |
| Monthly Payment | = $217 |

Fig. 9A

| Name = John Doe | Linking Identifier = AW33C |
|---|---|
| Card # | = 3720  113969  4408 |
| Card Balance | = $710 |
| Monthly Payment | = $56 |

Fig. 9B

| Name = John Doe | Linking Identifier = AW33C |
|---|---|
| Account # | = 4730  21379  1026 |
| Card Balance | = $250 |
| Monthly Payment | = $10 |

Fig. 10A

| Name = John Doe | Linking Identifier = AW33C |
|---|---|
| Business Phone | = (201) 555-7347 |
| Business Address | = 667 DOM Corporate Way Enton, NJ 07022 |
| Net Credit Service Date | = 6/1/75 |
| Annual Salary | = $45,500 |

Fig. 10B

| Name = John Doe | Linking Identifier = AW33C |
|---|---|
| Account Number | = DM0750 |
| Pension Balance | = Not Available |
| Loan Balance | = $2,010 |
| Monthly Payments | = $170 |

Fig. 11

| Name = John Doe | | Linking Identifier = AW33C |
|---|---|---|
| Context | Linking Reference (Entity Pointed to) | Local Identifier (Optional) |
| Residential | BOC Linking Application (Mapped from BOC Services Directory) | |
| | Licensed Driver Directory | |
| Business | BOC Linking Application (Mapped from BOC Services Directory) | |
| Loan | ABC Linking Application (Mapped from ABC Services Directory) | |
| Credit Card | Visa Directory | |
| | Mastercard Directory | |

Fig. 12

| Name = John Doe | Linking Identifier = AW33C | |
|---|---|---|
| Context | Linking Reference (Entity Pointed to) | Local Identifier (Optional) |
| Business | Personnel Directory | |
| Loan | Pension Directory | |

Fig. 13

| Name = John Doe | | Linking Identifier = AW33C |
|---|---|---|
| Context | Linking Reference (Entity Pointed to) | Local Identifier (Optional) |
| Residential | White Pages Directory | 201 555 2121 |
| Business | DOM Linking Application (Mapped from DOM Services Directory) | |
| Loan | DOM Linking Application (Mapped from DOM Services Directory) | |

Fig. 14

| Name = John Doe | | Linking Identifier = AW33C |
|---|---|---|
| Context | Linking Reference (Entity Pointed to) | Local Identifier (Optional) |
| Loan | Automobile Loan Directory | |
| | Mortgage Loan Directory | |
| | Personal Loan Directory | |

Fig. 15

John Doe

Residential

Address: 21 Elm Street
 Elmville, NJ 07001
Phone: (201) 555-2121
Date of Birth:12/12/50
Male/Female:Male Business Address: 667 DOM Corporate Way
 Enton, NJ 07022
Phone: (201) 555-7347
Net Credited Service Date:6/1/75
Annual Salary: $45,000

Loans

| Account Numer | Loan Balance | Monthly Payments |
|---|---|---|
| NY6643 | $10,500 | $310 |
| NJ5532 | 87,543 | 675 |
| NY7749 | 2,540 | 217 |
| DM0750 | 2,010 | 170 |

Credit Cards

| Card # | Card Balance | Monthly Payments |
|---|---|---|
| 3720 113969 4408 | $710 | $56 |
| 4730 21379 1026 | 250 | 10 |

LINKING SYSTEM AND METHOD FOR ACCESSING DIRECTORY INFORMATION ABOUT AN OBJECT IN ONE CONTEXT WHEN INFORMATION IN ANOTHER CONTEXT IS KNOWN

RELATED APPLICATION

Pending U.S. patent application Ser. No. 07/621,607, entitled *Network and Method for Providing Cross-Media Connection* filed on Dec. 3, 1990, for applicants P. C. Bates, J. M. Eisman, G. Gopal, N. A. Ostroff, and F-L Wu, now U.S. Pat. No. 5,239,577, issued Aug. 24, 1993, which is assigned to the assignee hereof, contains subject matter related to that of the present application and is incorporated herein by reference.

1. Field of the Invention

The present invention relates to a network of directories employing a standard directory protocol and a method for retrieving information in response to queries from directory users.

2. Background of the Invention

The X.500 standard has been developed by the International Telegraph and Telephone Consultative Committee (CCITT) to support the interconnection of local directories holding information and users of directory information for the purpose of providing directory services. CCITT, *The Directory—Overview Concepts, Models, and Services*, X.500 Series Recommendation, Document AP IX-47-E. X.500 defines a standard protocol for directory users to communicate with different local directories which are owned, operated, or managed by different entities. This standard also defines directory services available to users.

The usefulness of the standard is demonstrated by the following example. Assume that a user wishes to retrieve credit information about a person, John Doe. As shown in the table of FIG. 1, John Doe has credit information in different contexts (e.g. residential, business, etc.) scattered among multiple local directories held by various entities. Residential information about John Doe is held by both the BOC Telephone Company in its Whites Pages directory, and the Division of Motor Vehicles (DMV) in its directory of Licensed Drivers. Mr. Doe also has automobile, mortgage, and personal loans at ABC Bank, and information regarding these loans is maintained in three separate directories of ABC Bank. In addition, Mr. Doe also has mastercard and visa credit cards through the Credit Card (CC) Company, and information regarding these cards is held in CC's Visa and Mastercard directories. Lastly, DOM Corporation is Mr. Doe's place of employment, and business information, such as his date of employment, salary, and outstanding loan against his pension plan, is held in DOM's Personnel and Pension directories, respectively.

Prior to the X.500 standard being established, a user wishing to contact various local directories maintained by different entities to obtain John Doe's credit information could not easily do so because of language and communication barriers between the user and various entities. The user had to know and adapt to the specific protocol of each entity maintaining desired directory information in order to communicate requests for information to the entity in cognizable form and to translate information once retrieved. The X.500 standard provides a standard protocol which reduces these communication barriers and allows users to access information and also permits local directories maintained by different entities and to communicate with one another.

FIG. 2 depicts a basic functional model of an interconnection network 100 employing the X.500 standard for providing directory service. This model shows four main elements: directory service users 10, 15; directory user agents (DUAs) 20, 25; directory system agents (DSAs) 30–60; and local directories 75. Users 10 and 15 are entities utilizing directory services. Traditionally, a directory service user has been a human being, but a user could also include a machine such as a computer executing an automated software program.

DUAs 20 and 25 serve as the interface for users 10 and 15 in the interconnection network 100. A user interacts with a DUA in inputting a directory request and retrieving requested information. The DUA drives menus and presentations of information at a human-machine interface (for a human user) or an application to directory application interface (for a computer automated user). The DUA also formats the user's request and communicates the request to DSAs performing data retrieval from local directories 75 in the network.

In general, a DSA serves as interface between one or more local directories 75 and DUAs or other DSAs. A DSA also serves as a point of interconnection between DUAs and other DSAs. As shown in FIG. 2, DSA 50 serves as an interface between multiple local directories 75 and DUA 20 and other DSAs in the interconnection network 100. DSA 60 serves as a point of interconnection between DSA 30 and DSA 50 as well as an interface between its local directory 75 and other DSAs in the interconnection network 100.

DSAs support access to information in local directories and manage and retrieve directory information. Also, after retrieving information from its local directories, the DSA formats the response to directory requests from users, and communicates the response to the user's DUA. The DSA also communicates with and forwards requests to other DSAs when it cannot find the requested information locally.

A DSA and a DUA communicate using X.500 directory access protocol (DAP), and two DSAs communicate using standard X.500 directory system protocol (DSP). As shown in FIG. 2, DSAs 30 and 50 are connected to DUA 20 via links 80 and 82, respectively, using the DAP protocol, and likewise, DSA 40 and DUA 25 communicate via link 81 using the DAP protocol. Furthermore, DSA 30 is connected to DSAs 40 and 60 via links 90 and 92, respectively, using the DSP protocol, and DSAs 60 and 50 are connected via link 94 also using DSP protocol.

In addition to minimizing the communication barriers between users and local directories, the X.500 standard also provides some directory services capabilities to facilitate retrieval of directory information. FIG. 3 depicts an interconnection of a user and different entities which contain credit information for John Doe, as discussed in the example above and shown in the table of FIG. 1. Under the X.500 standard, user 10 could request John Doe's visa card balance by sending, via its DUA 20, the distinguished name of the entry for John Doe in CC's Visa directory to DSA 130. The distinguished name is a term of art under the X.500 standard and is the distinctive name of a network element (i.e. DSA, DUA, local directory and directory entry) which uniquely and unambiguously identifies the element in the network. Therefore, to be consistent with the standard, the term distinguished name is used to identify network elements.

The distinguished name inputted by user 10 uniquely and unambiguously identifies the entry for John Doe in the Visa directory 141 connected to the DSA-CC 140. In order to provide the proper distinguished name, the user must know that John Doe has a visa card with CC Company. Providing the distinguished name also requires that the user knows the full path from the top of the global directory (here, we assume that the interface to the top of the global directory is DSA 130) for John Doe in the Visa directory 141.

Upon receiving a request from the user 10 which includes the distinguished name of the entry for John Doe in the Visa directory 141, DSA 130 has the option of handling this request using different capabilities of the X.500 standard which include chaining, referral, and search capabilities. The chaining, referral, and search capabilities are available through the implementation at each DSA of knowledge references about other neighboring DSAs. If a DSA receives a query indicating a distinguished name not held by the DSA, the DSA knowledge references enables the DSA to know to which other DSA to chain or refer the request. For example, in FIG. 3., DSA 130 has knowledge references which indicate that directory queries indicating the distinguished name for the CC Company should be sent to DSA-CC 140 and directory queries indicating the distinguished name for ABC Bank should be sent to DSA-ABC 150.

Upon receiving a request from the user 10 which includes the distinguished name of the entry for John Doe in the Visa directory 141, DSA 130 can either transfer the request to DSA 140 using the chaining capabilities of the X.500 standard or refer the user 10 directly to DSA 140 using the referral capability of the X.500 standard. The chaining capability allows a DSA, which does not hold the requested information, to handle the request for the user by transferring the request directly to the DSA corresponding to the distinguished name specified by the user. The referral capability allows a DSA, which does not hold the requested information, to refer the user to another DSA by returning to the user the distinguished name of the other DSA so that the user can launch a request directly to the other DSA.

Another capability of the X.500 standard is searching. Illustratively, the search capability allows the user 10 to specify the distinguished name of the CC Company and to request a broadcast search for information regarding John Doe on all of its local directories. From the distinguished name of CC Company, DSA 130 will determine that DSA-CC 140 corresponds to the CC Company and will send the query to DSA 140 for a broadcast search. This search is less efficient than a direct search by the distinguished name of John Doe's entry in the Visa directory. Furthermore, DSA-CC 140 could deny such a broadcast search request. Therefore, if user 10 does not know all necessary information to compose the distinguished name for the information sought or cannot contact the proper DSA directly, accessing desired information is difficult, since the X. 500 has limited capabilities.

A drawback of the X.500 standard is that it does not provide an effective mechanism for cross-referencing information in the interconnection network or for efficiently narrowing the scope of the search for local directories to locate the requested information. Even if the user knows information about John Doe in one context held by one local directory, in most cases, the user cannot cross-reference this information to access information about John Doe in another context held in another local directory in the network. For example, even if user 10 knows that John Doe has loan accounts at ABC Bank and knows the distinguished name for John Doe's entry in the Automobile, Mortgage, and Personal directories of ABC Bank, this knowledge would not be useful in accessing John Doe's visa credit card information in the Visa directory of the CC Company. Therefore, if user 10 launches a request for John Doe's visa card information to DSA-ABC 150 (via its DUA 20 and DSA 130), DSA-ABC 150 would search its local directories for the requested information and would respond with a "not found" message indicating that the requested information could not be found in its local directories.

X.500 does not provide a complete solution which permits the user to access requested information about John Doe when other directory information is known, since this standard does not define DSA mechanisms for relating or cross-referencing directory entries associated with the same object. Such mechanisms are left as a matter for the users and providers of directory services to agree upon. However, two mechanisms, aliases and seeAlso references, which are defined in the standard, could be used to provide limited support for relating directory entries associated with an object. However, the full functionality and effectiveness of arbitrary cross-context searches cannot be achieved using the aliases and seeAlso mechanisms.

A drawback of using the seeAlso mechanism is high administrative overhead since relating directory entries holding information of the same object requires that entries of an object maintain a seeAlso reference for every other directory entry of the same object. Another problem with seeAlso reference is that a DSA maintaining the seeAlso reference does not use the reference to query information from another directory entry. Instead, the user is responsible for sending the appropriate query to the directory entry identified by the seeAlso reference.

Although the X.500 standard provides interconnection between DSAs and some limited directory service capabilities, it does not provide a viable method for cross-referencing or narrowing the search scope for directories having entries associated with the same object. Nor does the standard permit a user to access information in one context when information in another context is known. To improve directory services under the X.500 standard, a linking directory could be employed. A linking directory includes one entry per object which could be a person as in the above example, such as John Doe, but an object could also be a business, an account, or any "thing" for which information could be stored in a local directory. Each entry in the linking directory comprises pointers to other directories which include more comprehensive information about the object. Thus, the linking directory does not attempt to collect together comprehensive information about an object, but instead is a directory of directories.

Previous research on interconnecting directories has been directed to locating directory entries in distributed directory systems. (B. Lampson, "Designing a global name service," Proceedings of Fifth Symposium on the Principles of Distributed Computing, August 1986; D. Oppen and Y. Dalal, "The Clearinghouse: a decentralized agent for locating named objects in a distributed environment," ACM Transactions on Office Information Systems, Vol. 1, No. 3, July 1983; L. L. Peterson, "The Profile Naming Service," ACM Transactions on Computer Systems, Vol. 6, No. 4, Nov. 1988.) However, none of these prior art studies has provided a satisfactory solution for linking together entries distributed among directories for objects in multiple contexts to permit cross-context retrieval of information within the directory network. Furthermore, none of these prior art studies have demonstrated an effective mechanism which allows cross-context information retrieval in a directory network employing a standard protocol, such as X.500, and which enhances the directory service capabilities of the standard without changing its structure and characteristics.

Accordingly, it is an object of the present invention to provide a linking system for improving services in a network of directories which employs a standard directory protocol, such as the X.500 standard. It is a further object of our invention to provide a method for allowing a user to access directory information about an object in one context by knowing directory information about the object in another context.

SUMMARY OF THE INVENTION

Our invention relates to a linking system for enhancing directory service in a network of directories employing a standard directory protocol such as the X.500 standard. Our invention also relates to a method to be implemented in a network of directories employing a standard directory protocol for accessing directory information about an object in one context, when directory information about the object in another context is known.

This linking system comprises an interconnection network which employs a standard directory protocol, such as X.500, and linking components. The interconnection network comprises DUAs and DSAs for interconnecting users and directories. DUAs are users' interfaces in the interconnection network. DUAs format users' requests, communicate requests to DSAs, and receive requested information in response to users' requests. DSAs serves as interfaces for one or more directories to DUAs and other DSAs and for linking components to the interconnection network. DSAs also serve as points of interconnection between DUAs, other DSAs, and linking components.

The linking components include linking directories and linking applications. Users access a linking application by inputting the distinguished name of a corresponding services directory. Users perceive the services directory to be a logically centralized directory containing comprehensive information about multiple objects in different contexts. DSAs contain an entry in its knowledge reference which maps the distinguished name of the services directory to distinguished name of the linking application.

The linking application receives users' requests and coordinates a response by sending queries to its linking directory, local directories, and other linking applications (which are perceived to be services directories) in the interconnection network. Linking directories contain entries, and there is one entry for each object. This entry is accessible using a linking identifier which is unique to the object. Each entry comprises linking references which may point to local directories and linking applications perceived to be services directories. Local directories pointed to by linking references hold more comprehensive information about the object in particular contexts. Linking applications pointed by linking references access other linking directories containing linking references which further pointed to local directories holding information about the object. Therefore, the linking directory is a directory of directories.

The use of the linking system for retrieving directory information can be explained by taking for example a user who wishes to access credit information for John Doe, who is the object. However, the user only knows John Doe's driver's license number. To access Mr. Doe's visa credit information, the user inputs its request to its DUA which includes John Doe's driver's license number along with a request for John Doe's visa credit card information. This request is formatted at the user's DUA and transferred to what the user perceives to be the Credit Bureau services directory which is perceived to hold credit information about various persons in different contexts. However, in reality, the request is transferred through mapping at a DSA, to the Credit Bureau linking application. The Credit Bureau linking application then forwards a first query to the DSA-DMV where the Licensed Driver directory is connected. At the Licensed Driver directory, the linking identifier for John Doe is retrieved. Thus, in response to the user's request which includes known information about John Doe in one context, the Credit Bureau linking application obtains the linking identifier uniquely identifying John Doe.

The Credit Bureau linking application then launches a second query containing the linking identifier to the Credit Bureau linking directory to retrieve the linking reference which points to the local directory containing information about John Doe in the credit cards context. Alternatively, the linking reference could point to another linking application which, from the perspective of the Credit Bureau linking directory, is perceived to be another services directory. The linking application pointed to by the linking reference facilitates access to another linking directory containing linking references which further points to a local directory containing the requested information.

The Credit Bureau linking application then launches a third query using the linking reference to locate CC's Visa directory and the linking identifier as a key to access the directory entry for John Doe and retrieve the requested information. This retrieved information is formatted by the Credit Bureau linking application and forwarded to the user's DUA in response to the user's request.

Use of our linking system and method has several important advantages which include:

Enhanced Directory Service—users can access information even when all the information necessary to compose the distinguished name of the entry containing the information is not known;

Cross-Context Retrieval Capabilities—users can access information about an object in one context by knowing information about the object in another context;

Preservation of Standard Directory Protocol—directory service capabilities are enhanced without changing the functional model of the X.500 standard;

Security—each directory database can provide its own access restrictions;

Privacy—the linking application can respond to a user's request without revealing the directory from which the information was retrieved or its distinguished name;

Ownership of Information—information is distributed among entities that control and maintain the information, and all information about different objects need not be centralized in a single location; and Controlled data redundancy—the unique linking identifier of an object serves as a link among many directories, thereby eliminating or reducing the need to store the same information in many directories.

Thus, our inventive linking system, by employing linking applications and linking directories, provides a highly advantageous structure and method for cross-context retrieval of information without altering the standard directory protocol.

BRIEF DESCRIPTION OF THE DRAWINGS

FIG. 1 is a table showing different entities holding directory information regarding John Doe.

FIGS. 6 and 7 illustrate entries containing information about John Doe in the residential context at the White Pages and Licensed Drivers directories, respectively.

FIGS. 8(A), 8(B) and 8(C) illustrate entries containing information about John Doe in the loan context at ABC's Automobile, Mortgage, and Personal directories, respectively.

FIGS. 9(A) and (B) illustrate entries for John Doe in the credit card context at CC's Visa and Mastercard directories.

FIGS. 10(A) and (B) illustrate entries for John Doe at DOM's Personnel and Pension directories in the business and loan contexts, respectively.

FIGS. 11, 12, 13 and 14 depict entries in Credit Bureau, DOM, BOC, and ABC linking directories corresponding to John Doe in various contexts.

FIG. 15 depicts information formatted and sent by the Credit Bureau linking application to the user in response to the user's request.

DETAILED DESCRIPTION OF THE INVENTION

Figure 2:
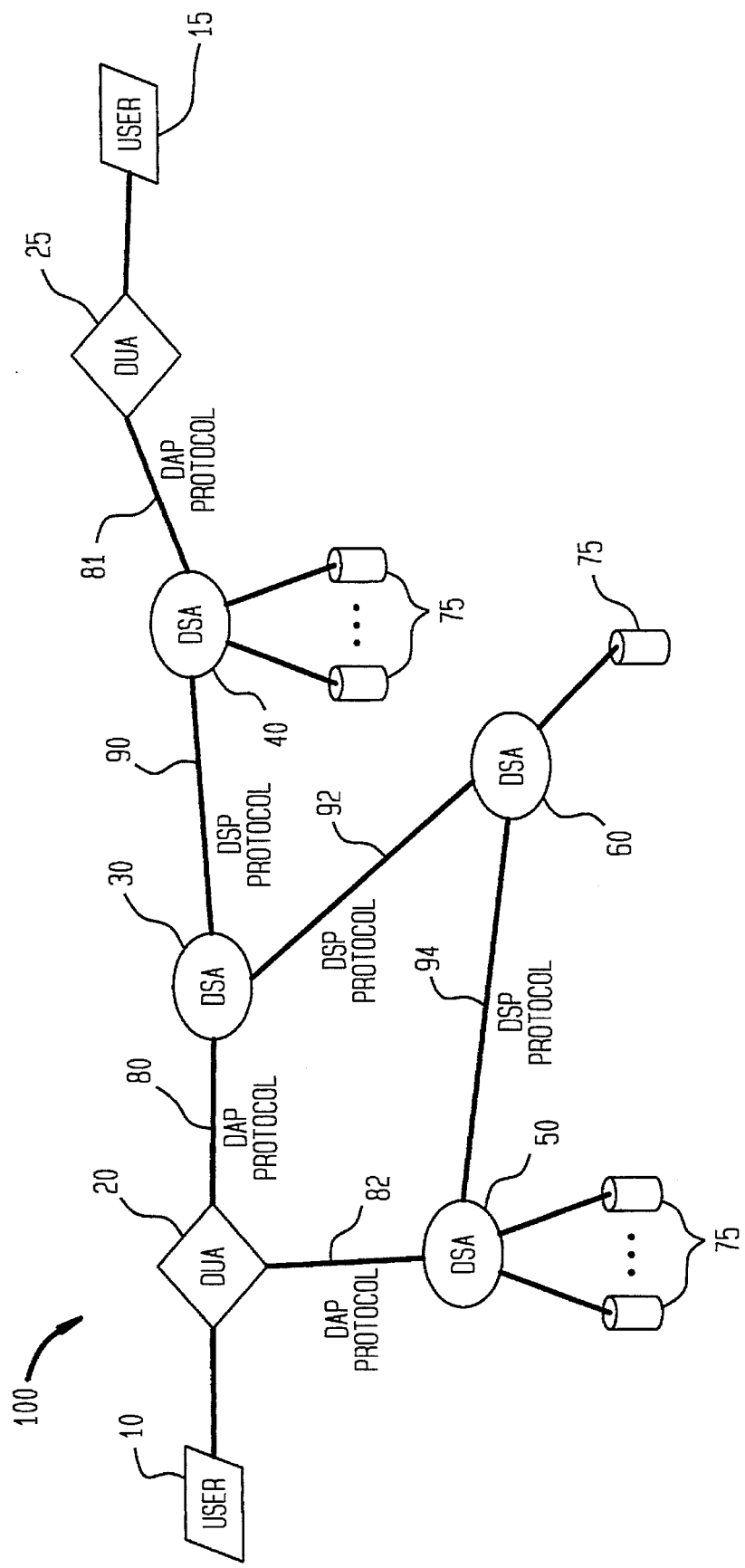
FIG. 2 depicts a functional model of an interconnection network employing the X.500 standard, from the prior art, for interconnecting directories and users of directory information.
Figure 3:
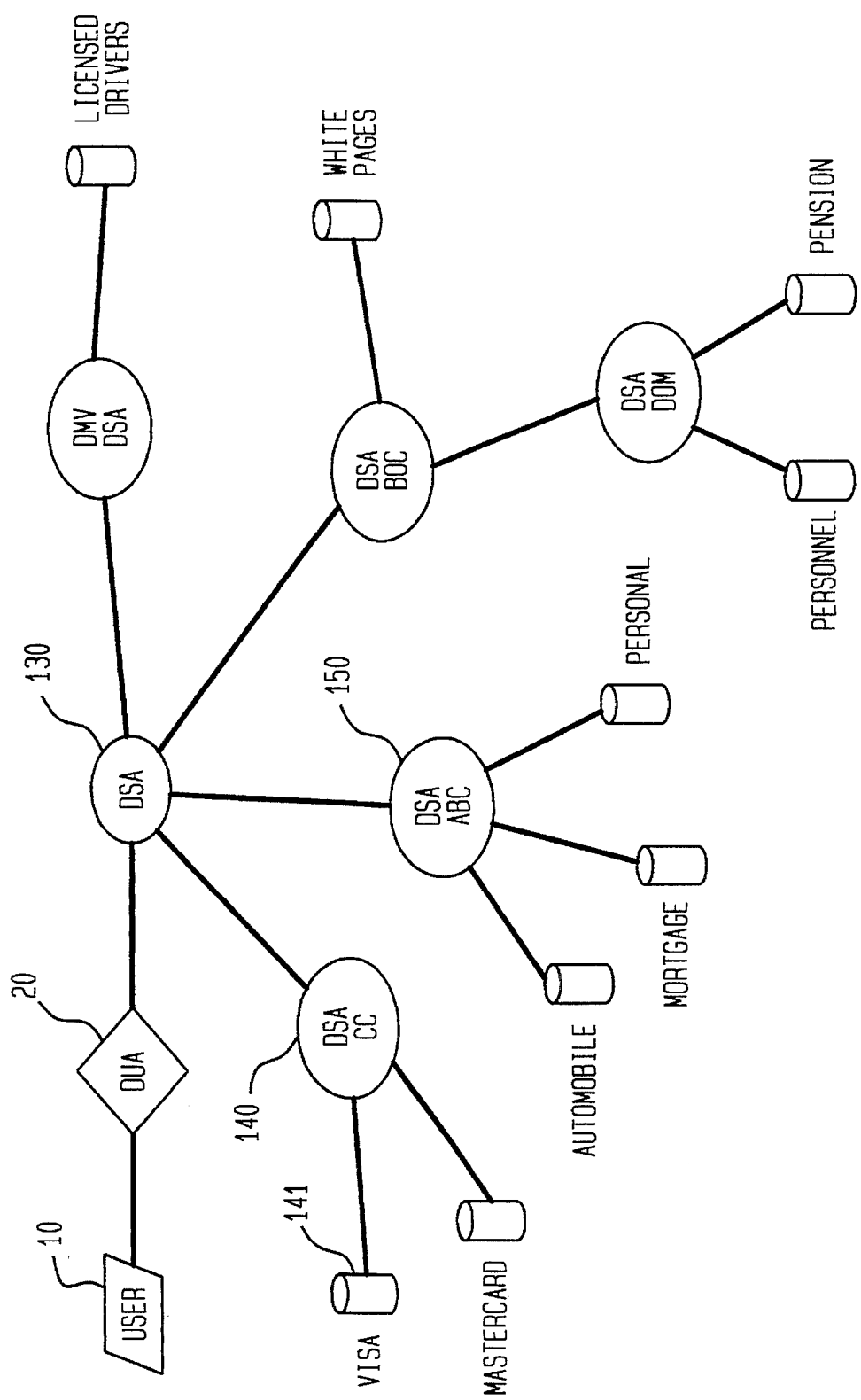
FIG. 3 depicts an X.500 standard network interconnecting a user and multiple directories which contain credit information about John Doe as shown in FIG. 1.
Figure 4:
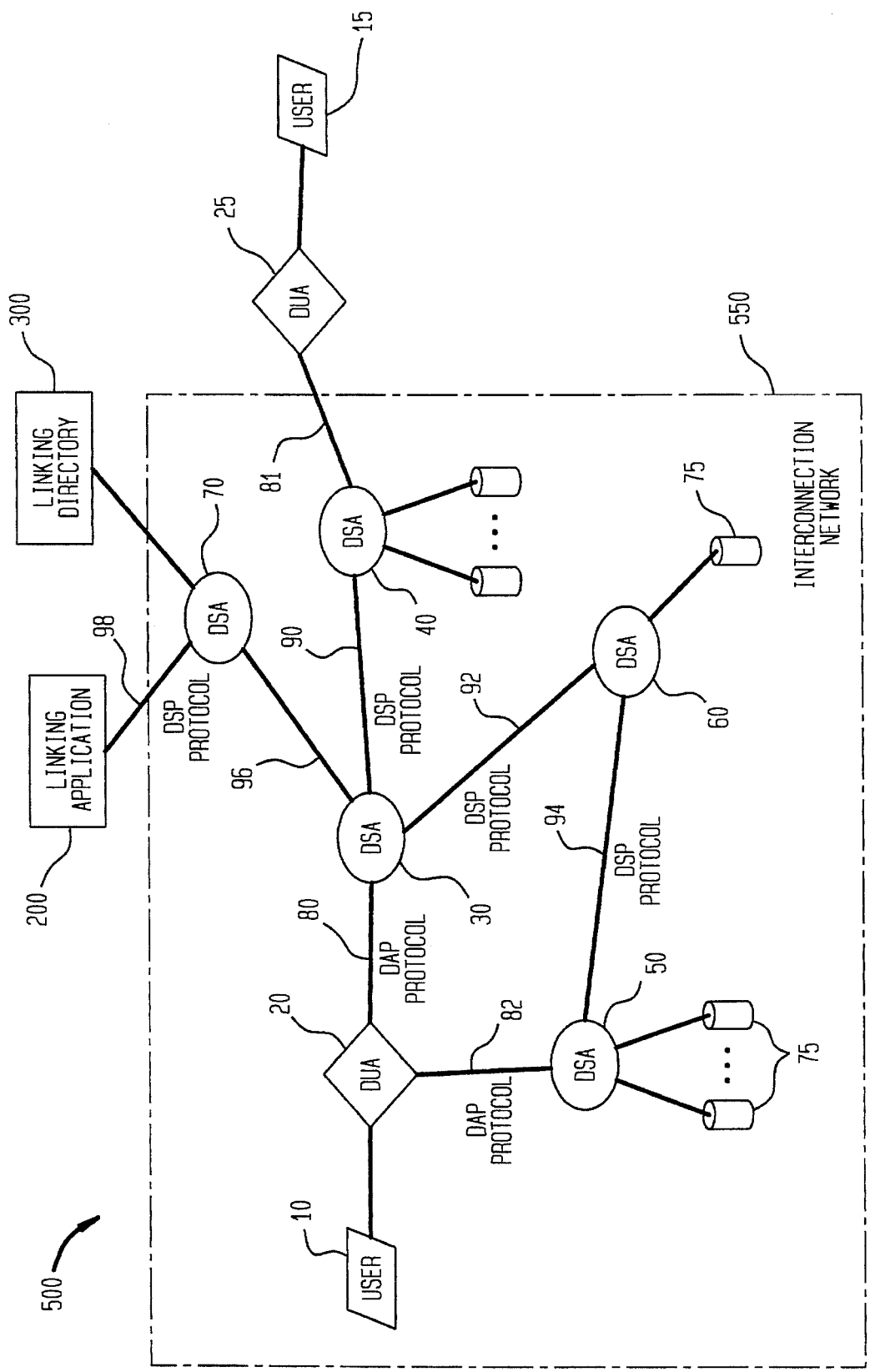
FIG. 4 depicts a representative embodiment of our linking system, in accordance with an aspect of our invention, for enhancing directory service in a network of directories, which network employs a standard directory protocol, such as the X.500 standard.

FIG. 4 depicts a representative embodiment of our linking system for enhancing directory service in a network of local directories, which network employs a standard directory protocol, such as the X.500 standard. This linking system 500 comprises an interconnection network 550 which employs a standard directory protocol, such as X.500, and linking components 200 and 300. The interconnection network 550 comprises DUAs 20 and 25 and DSAs 30-70 for interconnecting multiple users 10 and 15, and local directories 75, which contain information about different objects. DUAs are users' interfaces in the interconnection network 550 and function as discussed in the Background of the Invention. DSAs serve as interfaces for one or more local directories in the interconnection network as discussed in the Background of the Invention. In addition, DSAs 30 and 70 serve as interfaces for linking components 200 and 300 to the interconnection network 550. DSAs are connected to DUAs via links 80 - 82 using standard protocol, such as the DAP protocol of the X.500 standard. Furthermore, DSAs are interconnected by links 90 - 96 using a standard protocol, such as the DSP protocol of the X.500 standard.

Each local directory 75 contains multiple entries, and each entry contains information about one object. Each entry also contains an identifier which uniquely identifies its corresponding object. The identifier may be a linking identifier which uniquely identifies the object globally in the interconnection network. The identifier may also be a local identifier which uniquely identifies the object within the local directory where the entry for the object is held.

The linking components include the linking directory 300 and the linking application 200. The linking system 500 of FIG. 4 illustratively shows a single linking application and a single linking directory. However, multiple linking applications and linking directories may be employed in the linking system. The linking directory 300 is a data base comprising memory for storing directory entries. The linking directory 300 is a directory of directories containing an entry for each object, which entry is accessible using a linking or local identifier which is unique to the object. Each entry contains linking references, which point to entities having further access to information regarding the object. The entities pointed to could be local directories holding more comprehensive information about the object in a particular context. The entities could also be linking applications which facilitate access to other linking directories containing linking directories which further point to local directories holding information about the object.

Figure 4A:
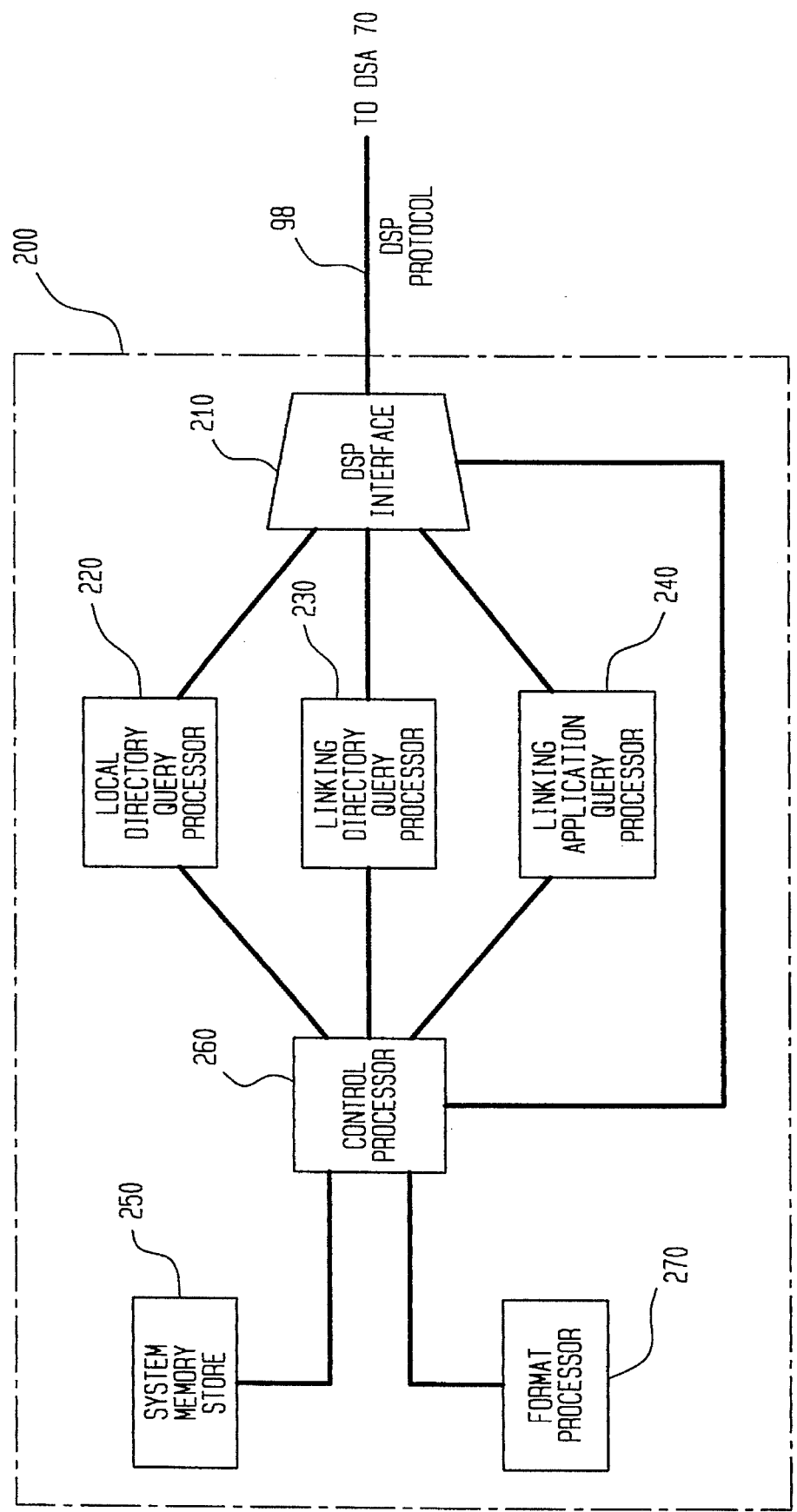
FIG. 4A depicts an illustrative embodiment of our linking application in accordance with an aspect of our invention.

The linking application 200 is a computer system and an illustrative embodiment of this linking component is depicted in FIG. 4A. As shown, the linking application 200 comprises a DSP interface 210 for communicating with DSA 70 via link 98 using the DSP protocol. The linking application 200 receives user requests and communicates with other network elements via the DSP interface 210. The DSP interface 210 is connected to the query processors 220, 230, and 240 which formulate and launch queries to be sent to local directories, the linking directory or other linking applications, respectively, in the network. Optionally, a single query processor could be used for formulating and launching queries to any combination of the local directories, the linking directory or other linking applications. The linking application 200 also comprises a system memory store 250 for storing linking computer software used for operating the linking application. Control processor 260 implements software stored in system memory store 250 and controls the formulation and launching of queries at query processors 220, 230, and 240. The control processor 260 also controls a format processor 270 which receives information retrieved from local directories and formats the information, as illustratively shown in FIG. 15, to be sent to requesting users.

The linking application 200 coordinates the retrieval of information in response to a user's request and formats the information to be sent to the user in response to the user's request. Users can access a linking application by inputting the distinguished name of a corresponding services directory. Users perceive the services directory to be a logical centralized directory containing comprehensive information about multiple objects in different contexts. DSAs contain an entry in its knowledge reference which maps the distinguished name of the services directory to the distinguished name of the linking application, thus permitting access to the linking application.

The coordination function of the linking application 200 includes: using known information inputted by the user to query a local directory to identify the linking identifier uniquely identifying the object; using the linking identifier to query the linking directory to access the linking reference which points to the entity (local directory or linking application) having further access to information regarding the object; and using the linking reference to locate the entity pointed to and the linking identifier to access the information in a particular context requested by the user.

The linking directory 300 of the linking system 500 is invoked when the user does not input the distinguished name of the directory entry holding the information about an object in a desired context but, instead inputs known directory information about the same object in one context and requests information in another desired context. Using the linking components in the interconnection network does not impair the directory service capabilities available through the standard directory protocol, such as X.500. Implementation of the linking components enhances the service capabilities of the standard directory protocol without altering the standard. The linking components ease the rigid constraints imposed upon users under a standard directory protocol by allowing users more flexibility in accessing desired information even when the proper distinguished name is not known. In addition, the linking components facilitate cross-referencing of information in one context to access information in another, and also facilitates navigating between directories to fulfill users' request in a systematic manner.

Figure 5:
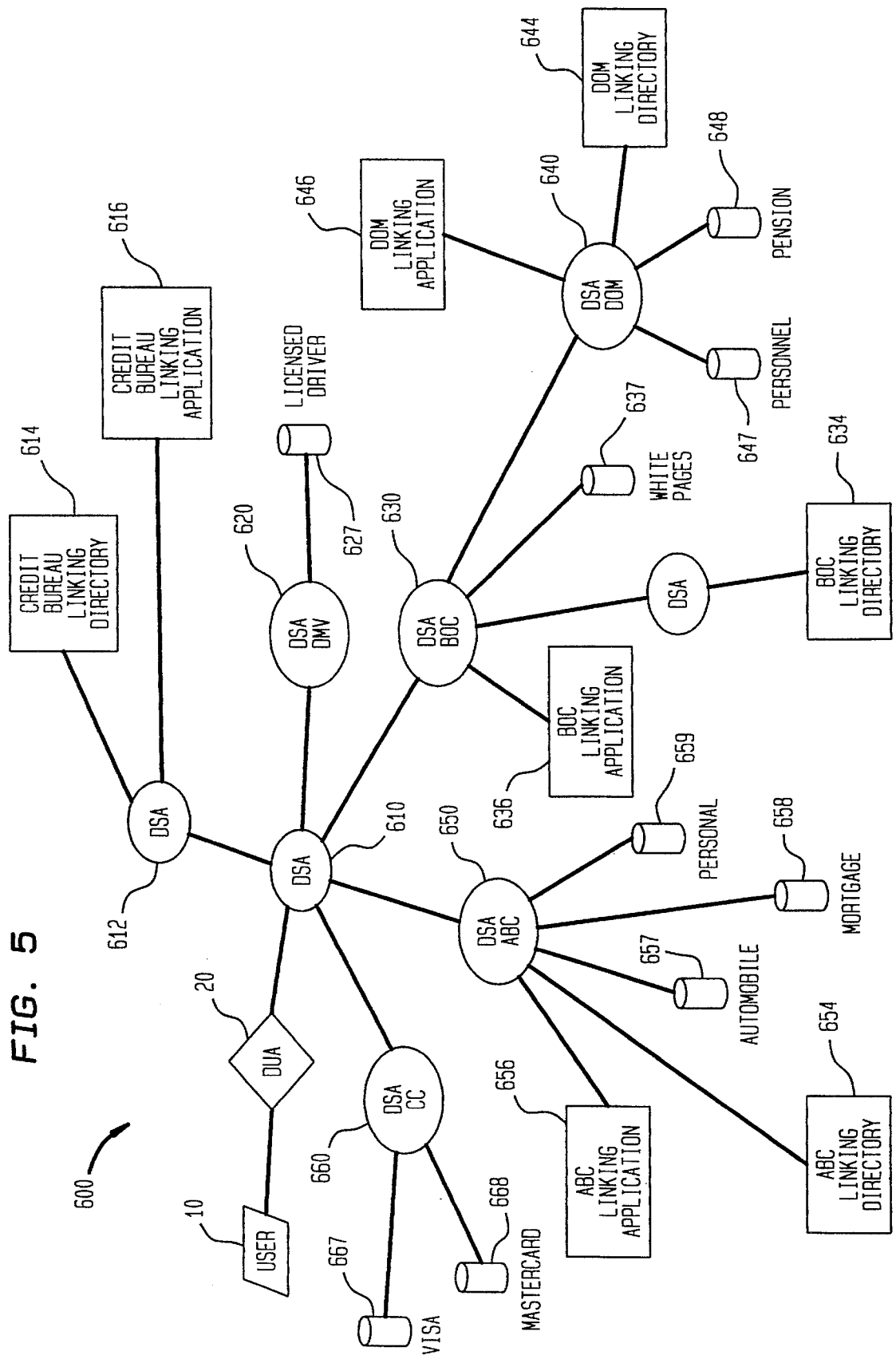
FIG. 5 depicts a linking system comprising an interconnection network, which interconnects a user and multiple directories via multiple DUAs and DSAs, and multiple linking applications and linking directories in accordance with an aspect of our invention.

To demonstrate how the linking system is utilized to retrieve cross-context information requested by a user, the credit information example featuring John Doe as discussed in the Background of the Invention is considered. As shown in FIG. 1, John Doe has credit information scattered in multiple local directories which are owned and maintained by different entities. FIG. 5 depicts a linking system 600 comprising an interconnection network, which interconnects user 10 and multiple directories, via multiple DUAs and DSAs, and multiple linking applications and linking directories. Each DSA contains in its knowledge reference an entry which maps the distinguished name of services directories to corresponding linking applications.

Each local directory shown in FIG. 5 contains multiple entries, and each entry contains information about one object, which illustratively, is a person, such as John Doe. Each entry also contains a linking identifier which uniquely identifies its corresponding object. FIGS. 6 and 7 illustrate entries containing information about John Doe in the residential context at the White Pages directory 637 owned by BOC Telephone Company and the Licensed Drivers directory 627 owned by DMV. FIGS. 8(A)–(C) illustrate entries containing information about John Doe in the loan context at the ABC's Automobile, Mortgage, and Personal directories 657, 658, and 659, respectively. FIGS. 9(A) and (B) illustrate entries for John Doe in the credit card context at CC's Visa and Mastercard directories 667 and 668, respectively. FIGS. 10(A) and (B) illustrate entries for John Doe at DOM's Personnel and Pension directories 647 and 648 in the business and loan contexts, respectively. Each of these directory entries illustratively depict a mapping between John Doe and his credit information in different contexts.

FIG. 5 also shows four linking directories: Credit Bureau 614, DOM 644, BOC 634, and ABC 654, and FIGS. 11–14, respectively, depict entries in these linking directories corresponding to John Doe in various contexts. John Doe's entry in the Credit Bureau linking directory 614, shown in FIG. 11, is discussed illustratively to describe the typical structure of linking directories. The entry shown in FIG. 11 contains a linking identifier which uniquely identifies John Doe as the object of the entry. The entry is accessed by using the linking identifier which may comprise a string of numbers or other alphanumeric characters. The context field includes the various contexts for which someone might wish to obtain credit information about John Doe, which contexts illustratively include, residential, business, loan, and credit card. The linking reference field provides pointers to a local directories which contain information about John Doe in the corresponding contexts. The linking reference field also provides pointers to linking applications. From the perspective of the linking directory, it is perceived that the linking reference field points to services directories. However, in DSAs knowledge reference, the services directory maps to linking applications. Therefore, in all actuality, the linking reference field points to linking applications which have further access to other linking directories containing other linking references which further point to local directories containing information about John Doe. For illustrative purpose, the linking reference field shows the entity pointed to rather than its distinguished name.

Optionally, the linking directory entry of FIG. 11 includes a local identifier field. This field includes the key for accessing a local directory which cannot be accessed using the linking identifier. As illustratively shown John Doe's entry in the BOC linking directory 634 of FIG. 13, John Doe's residential telephone number is the key for accessing his entry in the White Pages directory 637 (See FIG. 6). In addition, the linking directory entry may also include a target value field (not shown). This field can be used to provide actual information in particular contexts where a local directory is inaccessible or to expedite retrieval of frequently requested information.

To understand how the linking system of FIG. 5 is utilized for cross-context retrieval of information, consider the following example. For illustrative purposes, assume that John Doe has applied for an automobile loan, and that the lending institution wishes to check John Doe's credit information prior to approving the loan. Assume that the only information known to the lender is John Doe's driver's license number. The lending institution can utilize the linking system 600 to access comprehensive credit information about John Doe's in different contexts knowing only his driver's license number. The user 10 (lending institution) would input to its DUA 20 a request for information about John Doe in the residential, business, loan or credit card contexts or any combination of these contexts given Mr. Doe's driver's license number. Here, it is assumed that information in all of these contexts is requested by the user 10. Based upon this request, the user's DUA 20 will assemble a query and transfers this query to what is perceived to be the Credit Bureau services directory containing comprehensive information about different objects in various contexts. In reality, this query is mapped to the Credit Bureau linking application 616 via DSAs 610 and 612. The Credit Bureau linking application 616 uses the driver's license number and launches a query to the Licensed Driver directory 627, via DSAs 610 and 612 and DSA-DMV 620, and requests the linking identifier for John Doe.

Upon an entry being found in the Licensed Driver directory 627 which matches John Doe's driver's license number, the linking identifier (AW33C) is retrieved from the entry (see FIG. 7) and returned to the Credit Bureau linking application 616. This linking application 616 then uses the linking identifier to send a query to the Credit Bureau linking directory 614, via DSAs 612. The Credit Bureau linking directory 614 is queried for linking references pointing to entities, which include local directories containing credit information about John Doe in the residential, business, loans, and credit card contexts, and linking applications having access to other linking directories containing linking references which further point to such local directories. Although the Credit Bureau linking directory 614 actually points to linking applications, this linking directory 614 perceives that it is pointing to other services directories.

The entities pointed to by the linking references for different contexts are depicted in FIG. 11. These linking references are returned to the Credit Bureau linking application 616, which launches a third query including the linking identifier to the local directories and linking applications (perceived to be services directories) pointed to by the linking references. These local directories hold requested information in a corresponding context, and the linking applications have access to other linking directories containing linking references which further point to other local directories holding the requested information.

As shown in FIG. 11, the Credit Bureau linking directory 614 contains linking references which point to the CC's Visa and Mastercard directories 667 and 668 which hold information about John Doe in the credit card context. Consideration of the sequence of queries that transpires when third queries are sent from the Credit Bureau linking application 616 to the Visa and Mastercard directories 667 and 668 illustratively represent that taking place when a linking application queries local directories pointed to by a linking directory. Upon the queries from the Credit Bureau linking application 616 being received at the Visa and Mastercard directories 667 and 668, respectively, via DSAs 610 and 612 and DSA-CC 660, the directory entries for John Doe are accessed using the linking identifier. John Doe's visa and mastercard information shown in FIGS. 9A and 9B is then forwarded to the Credit Bureau linking application 616.

The Licensed Driver directory 627 is similarly pointed to by the Credit Bureau linking directory 614 for information in the residential context, and this information is similarly retrieved. However, the Credit Bureau linking application 616 could have retrieved residential information about John Doe without linking since the user 10 inputted John Doe's driver's license number which was sufficient information to identify the entry for John Doe in the Licensed Driver directory 627 and to retrieve information in the residential context.

The Credit Bureau linking directory 614 also contains a linking reference pointing to the BOC linking application 636 for information about John Doe in the residential and business contexts. Optionally, the Credit Bureau linking application 616 could be configured such that a query for residential information is sent to the BOC linking application 636 only if desired information about John Doe in the residential context was unavailable from the Licensed Driver directory 627.

The Credit Bureau linking directory 614 also contains linking references pointing to the BOC linking application 636 information about John Doe in the residential and business contexts. Consideration of the sequence of queries that transpires when a third query is sent from the Credit Bureau linking application 616 to the BOC linking application 636 illustratively represents that taking place when a linking application queries another linking application pointed to by a linking directory. Upon the query, which includes the linking identifier for John Doe, being received at the BOC linking application 636 via the DSA-BOC 630, this linking application 636 launches a query with the linking identifier to the BOC linking directory 634. Linking references pointing to the White Pages directory 637 (residential context) and the DOM linking application 646 (business and loan contexts) are then returned to the BOC linking application 636 (see FIG. 13).

As shown in FIG. 13, the BOC linking directory 634 contains a local identifier for the White Pages directory 637. Therefore, the BOC linking application 636 will send, via DSA-BOC 630, a query for the White Pages directory 637, which query includes the local identifier to be used as a key to retrieve information about John Doe in the residential context. John Doe's residential address and phone number are retrieved from the White Pages directory 637 (see FIG. 6) based on the local identifier and sent to the BOC linking application 636.

The BOC linking directory 634 also contains a linking reference pointing to what it perceives to be a the DOM services directory of by DOM Corporation. But, the linking reference maps to the DOM linking application 646 which has further access to John Doe's credit information in the loan and business contexts. The BOC linking application 636 will similarly send a query for the DOM linking application 646 via DSA-BOC 630 and DOM-DSA 640. A similar sequence of queries will subsequently be sent by the DOM linking application 646 to the DOM linking directory 644 using the linking identifier to obtain linking references, shown in FIG. 12, pointing to the Personnel and Pension directories 647 and 648, respectively (See FIGS. 10(A) and (B)).

Information regarding John Doe's loan balance contained in the Pension directory 648 and his business address, telephone number, net credited service date and annual salary contained in the Personnel directory 647 are retrieved and sent by the DOM linking application 646 to the BOC linking application 636. The BOC linking application 636 formats all information retrieved from the White Pages directory 637 and DOM's Personnel and Pension directories 647 and 648 and forwards a combined response to the Credit Bureau linking application 616.

The Credit Bureau linking directory 614 also contains a linking reference pointing to the ABC linking application 656 for accessing John Doe's credit information in the loan context. As discussed above, the Credit Bureau linking application 616 similarly sends a queries for the ABC linking application 656, via DSA-ABC 650. A similar sequence of queries subsequently is sent by the ABC linking application 656 to the ABC linking directory 654 using the linking identifier to obtain linking references shown in FIG. 14 which references point to the Automobile, Mortgage, and Personal directories 657-659. Information regarding John Doe's loans contained in these directories 657-659 is sent by the ABC linking application 656 to the Credit Bureau linking application 616.

Upon the requested information being retrieved by the Credit Bureau linking application 616, the information is formatted at the format processor 270 (FIG. 4A) and sent to the user 10 (lender institution) in response to the user's request as shown in FIG. 15. Specifically, the response includes credit information about John Doe in the residential, business, loans, and credit card contexts. Optionally, the response could be formatted without revealing to the user that this information was retrieved from multiple directories or the identities of these directories.

Our linking system and method give the user the ease and convenience of accessing a logically centralized directory containing information across multiple contexts without the security, maintenance, and data consistency problems associated with a true centralized directory. Our system and method also minimize security concerns of the directory owners by allowing users to access requested information without revealing to the user the entity owning the directory or its distinguished name. Furthermore, the user can access information in multiple contexts by only knowing information one context.

CONCLUSION

Thus, our linking system enhances directory services in a network, which interconnects local directories and users and employs a standard directory protocol, such as the X.500 standard, by implementing linking directories and linking applications. Our linking system allows a user to access information about an object in a particular context even if all the information necessary to compose the distinguished name of the directory entry holding the desired information is unknown. The user can access the requested information by inputting known information about the object in another context along with the information request. The linking application coordinates the response to the user's request by: using known information inputted by the user to query a local directory to retrieve the linking identifier for the object; using the linking identifier to query the linking directory to access linking reference which point to entities having further access to information about the object; and using the linking reference to locate the entity pointed to and the linking identifier to access the information in a particular context. The above-described embodiments of our invention are intended to be illustrative only. Numerous alternative embodiments of our invention may be devised without departure from the spirit and scope of the following claims.

What is claimed is:

1. A method of retrieving information in a system including a network which interconnects users and local directories and employs a standard directory protocol, at least one linking application, and at least one linking directory, comprising the steps of:

receiving at a linking application input from a user which includes known information about an object in a first context and a request for information about said object in at least one particular context;

sending from said linking application a first query to one of said local directories holding said known information about said object in said first context to retrieve a linking identifier which uniquely identifies said object;

sending from said linking application a second query, which includes said linking identifier, to a linking directory to access an entry in said linking directory corresponding to said object and to retrieve linking references which point to entities containing further information regarding said object in said other context, said entities including local directories and linking applications;

retrieving from said linking directory a key corresponding to each of said entities for accessing requested information about said object;

sending a third query, which includes said corresponding key, from said linking application to each of said entities pointed to by said linking reference to retrieve requested information; and at said linking application, formatting said requested information retrieved from said entities and sending said formatted information to said user in response to said request.

2. A method of retrieving information in a system including a network which interconnects users and local directories and employs a standard directory protocol, at least one linking application, and at least one linking directory, comprising the steps of:

receiving at a linking application user input which includes known information about an object in a first context and a request for information about said object in at least one particular context;

sending from said linking application a first query to one of the local directories holding said known information about said object in said first context to retrieve an identifier which uniquely identifies said object;

sending from said linking application a second query, which includes said identifier, to a linking directory to access an entry of said linking directory corresponding to said object and to retrieve at least one linking reference which points to an entity having further access to information regarding said object in said particular context, said entity being from the group of entities which includes local directories and linking applications;

sending a third query from said linking application to said entity pointed to by said linking reference to retrieve requested information; and formatting said requested information retrieved from said entity and sending said formatted information in response to said user's request.

3. The method of claim 2 of retrieving information in a network, wherein said identifier is a linking identifier which uniquely identifies said object in the network.

4. The method of claim 3 of retrieving information in a network, further comprising the step of retrieving from said linking directory a second identifier to be sent to said entity pointed to for accessing requested information.

5. The method of claim 4 of retrieving information in a network, wherein said second identifier is said linking identifier which uniquely identifies said object in the network.

6. The method of claim 4 of retrieving information in a network, wherein said entity pointed to includes one of the local directories which contains information about said object and wherein said second identifier is a local identifier which is a key for accessing said one of the local directories pointed to when access cannot be gained using said linking identifier.

7. The method of claim 2 of retrieving information in a network, wherein said identifier is a local identifier which uniquely identifies said object in said one of the local directories and in said entry of said linking directory.

8. The method of claim 2 of retrieving information in a network, wherein said entity pointed to is a second linking application having further access to another linking directory which contains another linking reference which further points to information requested about said object in said particular context.

9. The method of claim 1 of retrieving information in a network, wherein said second linking application queries a second linking directory to retrieve a second linking reference pointing to a second entity being from the group of entities which includes local directories and linking applications.

10. A system for retrieving information held in local directories based upon a user's request for information about an object in a particular context, comprising:

a network for interconnecting a plurality of users and a plurality of local directories, said network including user interfaces for connecting said users to said network and a plurality of directory interfaces, certain of said directory interfaces connecting said local directories to said network, wherein said user interfaces and said directory interfaces communicate using a standard directory protocol;

at least one linking directory connected to said network via one of said directory interfaces and having entries, wherein each entry corresponds to one object, contains linking references which point to entities having further access to information about its corresponding object in different contexts, and contains a linking identifier which uniquely identifies its corresponding object; and at least one linking application connected to said network via one of said directory interfaces and including means for sending a first query to said local directories to obtain said linking identifier uniquely identifying the object, means for sending a second query to said linking directory including said linking identifier to obtain said linking references which point to said entities, and means for sending a third query, which includes said linking identifier, to said entities pointed to by said linking references to retrieve requested information about the object in the particular context in response to the user's request wherein said entities are from the group of entities which includes local directories and linking applications.

11. A system for retrieving information held in local directories based upon a user's request for information about an object in a particular context, comprising:

a network for interconnecting at least one user and a plurality of local directories, said network including a user interface for each user for connecting the user to said network and a plurality of directory interfaces, certain of said directory interfaces for connecting said local directories to said network, wherein said user interlace and said directory interfaces communicate using a standard directory protocol;

at least one linking directory connected to said network via one of said directory interfaces and having entries, wherein one of said entries corresponds to the object, contains at least one linking reference which points to an entity having further access to information about the object in the particular context, and is accessible in response to an identifier which uniquely identifies the object; and at least one linking application connected to said network via one of said directory interfaces and including means for communicating with said local directories to obtain said identifier for the object, means for communicating with said linking directory using said identifier to obtain said linking reference which points to said entity, and means for communicating with said entity pointed to by said linking reference to retrieve information about the object in the particular context in response to the user's request, wherein said entity of said linking directory is from the group of entities which includes local directories and linking applications.

12. The system of claim 11 for retrieving information held in local directories based upon a user's request for information about an object in a particular context, wherein said linking application further comprises means for formatting retrieved information and sending said formatted information to said user interface of the user in response to the user's request, said, retrieved information being formatted with the option of not revealing to the user the identity of said local directory from which said information was retrieved.

13. The system of claim 11 for retrieving information held in local directories based upon a user's request for information about an object in a particular context, wherein said identifier is a linking identifier which uniquely identifies the object in the network.

14. The system of claim 13 for retrieving information held in local directories based upon a user's request for information about an object in a particular context, wherein said means of said linking application for communicating with said entity includes means for sending to said entity a second identifier to retrieve information about the object in the particular context in response to the user's request.

15. The system of claim 14 for retrieving information held in local directories based upon a user's request for information about an object in a particular context, wherein said second identifier is said linking identifier.

16. The system of claim 14 for retrieving information held in local directories based upon a user's request for information about an object in a particular context, wherein said entity pointed to is one of said local directories which contains information about the object in the particular context and wherein said second identifier is a local identifier which uniquely identifies the object at said one of said local directories.

17. The system of claim 14 for retrieving information held in local directories based upon a user's request for information about an object in a particular context, wherein said entity pointed to is another linking application.

18. The system of claim 11 for retrieving information held in local directories based upon a user's request for information about an object in a particular context, wherein said identifier is a local identifier which uniquely identifies the object corresponding to said one of said entries of said linking directory.

19. The system of claim 11 for retrieving information held in local directories based upon a user's request for information about an object in a particular context, wherein said standard directory protocol is X.500.

20. The system of claim 8 for retrieving information held in local directories based upon a user's request for information about an object in a particular context, wherein said directory interfaces communicate with one another using X.500 directory system protocol and said user interface communicates with said directory interfaces using X.500 directory access protocol.

21. The system of claim 20 for retrieving information held in local directories based upon a user's request for information about an object in a particular context, wherein said directory interfaces comprise a knowledge reference which includes an entry which maps said linking reference to said another linking application.

* * * * *